US010094316B2

(12) United States Patent
Kitaoka et al.

(10) Patent No.: US 10,094,316 B2
(45) Date of Patent: Oct. 9, 2018

(54) CONTROL APPARATUS FOR INTERNAL COMBUSTION ENGINE (71) Applicant: TOYOTA JIDOSHA KABUSHIKI KAISHA, Toyota-shi, Aichi-ken (JP)

(72) Inventors: Tatsuki Kitaoka, Miyoshi (JP); Sei Maruta, Toyota (JP); Kazuki Tsuruoka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/593,769

(22) Filed: May 12, 2017

(65) Prior Publication Data
US 2017/0335784 A1  Nov. 23, 2017

(30) Foreign Application Priority Data

May 17, 2016 (JP) ................................. 2016-099009

(51) Int. Cl.
F02D 41/22     (2006.01)
F02D 41/14     (2006.01)
F02D 41/26     (2006.01)
G01M 15/04     (2006.01)
F02D 41/28     (2006.01)

(52) U.S. Cl.
CPC .......... F02D 41/22 (2013.01); F02D 41/1498 (2013.01); F02D 41/26 (2013.01); F02D 2041/1432 (2013.01); F02D 2041/288 (2013.01); F02D 2200/101 (2013.01); F02D 2200/1012 (2013.01); G01M 15/046 (2013.01)

(58) Field of Classification Search
CPC ...... F02D 41/22; F02D 41/26; F02D 41/1497; F02D 41/1498; F02D 41/0097; F02D 2041/288; F02D 2041/1432; F02D 2200/101; F02D 2200/1012; G01M 15/046
USPC ....... 123/435, 436; 701/110, 111; 73/114.04, 73/114.25
See application file for complete search history.

(56) References Cited

U.S. PATENT DOCUMENTS 5,804,711 A * 9/1998 Remboski .............. G01M 15/11
                                                    73/114.05
8,694,226 B2 * 4/2014 Kurahashi ........... F02D 41/0085
                                                    701/103

FOREIGN PATENT DOCUMENTS

JP     H06-137164 A    5/1994
JP     2006-194099 A   7/2006

* cited by examiner

Primary Examiner — Hai Huynh
(74) Attorney, Agent, or Firm — Oliff PLC (57) ABSTRACT A control apparatus for an internal combustion engine (i) acquires a rotational speed signal correlated with a rotational speed of the internal combustion engine, (ii) extracts, from the acquired rotational speed signal, at least first-order and lower-order than the first-order components of the rotational speed signal, (iii) extracts, from the acquired rotational speed signal, at least an n-th-order component of the rotational speed signal, (iv) determines that no disturbance has occurred when a first-order parameter regarding a magnitude of an amplitude of the extracted first-order and lower-order than the first-order components is smaller than a first threshold, and (v) determines that a disturbance has occurred when the first-order parameter is equal to or larger than the first threshold and an n-th-order parameter regarding an amplitude of the extracted n-th-order component is equal to or larger than a second threshold.

6 Claims, 5 Drawing Sheets

CONTROL APPARATUS FOR INTERNAL COMBUSTION ENGINE

CROSS-REFERENCE TO RELATED APPLICATIONS

The disclosure of Japanese Patent Application No. 2016-099009 filed on May 17, 2016 including the specification, drawings and abstract is incorporated herein by reference in its entirety.

BACKGROUND

1. Technical Field

The disclosure relates to a control apparatus for an internal combustion engine.

2. Description of Related Art

In some cases, a disturbance may occur in an internal combustion engine as a result of running on a rough road. For example, Japanese Patent Application Publication No. 2006-194099 (JP 2006-194099 A) discloses an art of determining that a disturbance has occurred when a fluctuation rate of a rotational speed of an internal combustion engine is large. This fluctuation rate of the rotational speed is calculated as a difference between the last-detected rotational speed and the currently detected rotational speed.

SUMMARY

However, when the rotational speed of the internal combustion engine periodically fluctuates due to a disturbance, the period from a timing of last detection of the rotational speed to a timing of current detection of the rotational speed may be close to the cycle of fluctuation of the rotational speed, so the fluctuation rate may be calculated as a small value. In this case, it may be determined that no disturbance has occurred despite the occurrence of the disturbance. As a result, the accuracy in making a determination on the occurrence of a disturbance may deteriorate.

Besides, the fluctuation rate of the rotational speed of the internal combustion engine may also change due to a factor other than a disturbance, for example, an unstable combustion state. Therefore, the fluctuation rate of the rotational speed may increase due to the unstable combustion state, so it may be determined that a disturbance has occurred although no disturbance has occurred. In this case as well, the accuracy in making a determination on the occurrence of a disturbance may deteriorate.

Thus, the disclosure provides a control apparatus for an internal combustion engine with the accuracy in making a determination on the occurrence of a disturbance restrained from deteriorating.

Thus, according to one aspect of the disclosure, there is provided a control apparatus for an internal combustion engine that is equipped with an electronic control unit that performs the following functions. This electronic control unit is configured to: (i) acquire a rotational speed signal correlated with a rotational speed of the internal combustion engine having n cylinders where n is larger than two, (ii) extract, from the acquired rotational speed signal, at least first-order and lower-order than the first-order components of the rotational speed signal when one cycle is defined as one combustion cycle of the internal combustion engine, (iii) extract, from the acquired rotational speed signal, at least an n-th-order component of the rotational speed signal when one cycle is defined as one combustion cycle of the internal combustion engine, (iv) determine that no disturbance has occurred when a first-order parameter regarding a magnitude of an amplitude of the extracted first-order and lower-order than the first-order components is smaller than a first threshold, and (v) determine that a disturbance has occurred when the first-order parameter is equal to or larger than the first threshold and an n-th-order parameter regarding an amplitude of the extracted n-th-order component is equal to or larger than a second threshold.

A disturbance in the internal combustion engine resulting from the running of a vehicle on a rough road or the like is reflected by low-frequency components, namely, the first-order and lower-order than the first-order components of the rotational speed signal. Therefore, when the first-order parameter is smaller than the first threshold, it can be determined that no disturbance has occurred. Besides, even when the first-order parameter is equal to or larger than the first threshold, the amplitude of the first-order and lower-order than the first-order components may increase as a result of the unstableness of combustion instead of the disturbance. It should be noted herein that when the combustion in one of the n cylinders of the internal combustion engine is unstable, the amplitude of the n-th-order component decreases. Therefore, when the first-order parameter is equal to or larger than the first threshold and the n-th-order parameter is equal to or larger than the second threshold, the combustion is stable, and it can be determined that a disturbance has occurred. Accordingly, the control apparatus for the internal combustion engine as described above can restrain the accuracy in making a determination on the occurrence of a disturbance in the internal combustion engine from deteriorating.

Besides, in the control apparatus for the internal combustion engine, the electronic control unit may be configured to determine that a combustion state of the internal combustion engine is unstable when the n-th-order parameter is smaller than the second threshold.

Besides, in the control apparatus for the internal combustion engine, the electronic control unit may be configured to calculate a length as the first-order parameter, the length being a length of a waveform of the extracted first-order and lower-order than the first-order components shown on a time axis within a predetermined period.

Besides, in the control apparatus for the internal combustion engine, the electronic control unit may be configured to calculate an area as the first-order parameter, the area being surrounded by a waveform of the first-order and lower-order than the first-order components shown on a time axis and a straight line extending parallel to the time axis within a predetermined period.

Besides, in the control apparatus for the internal combustion engine, the electronic control unit may be configured to calculate a length as the n-th-order parameter, the length being a length of a waveform of the extracted n-th-order component shown on a time axis within a predetermined period.

Besides, in the control apparatus for the internal combustion engine, the electronic control unit may be configured to calculate an area as the n-th-order parameter, the area being surrounded by a waveform of the n-th-order component shown on a time axis and a straight line extending parallel to the time axis within a predetermined period.

As described above, the disclosure can provide a control apparatus for an internal combustion engine that restrains the accuracy in making a determination on the occurrence of a disturbance in the internal combustion engine from deteriorating.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
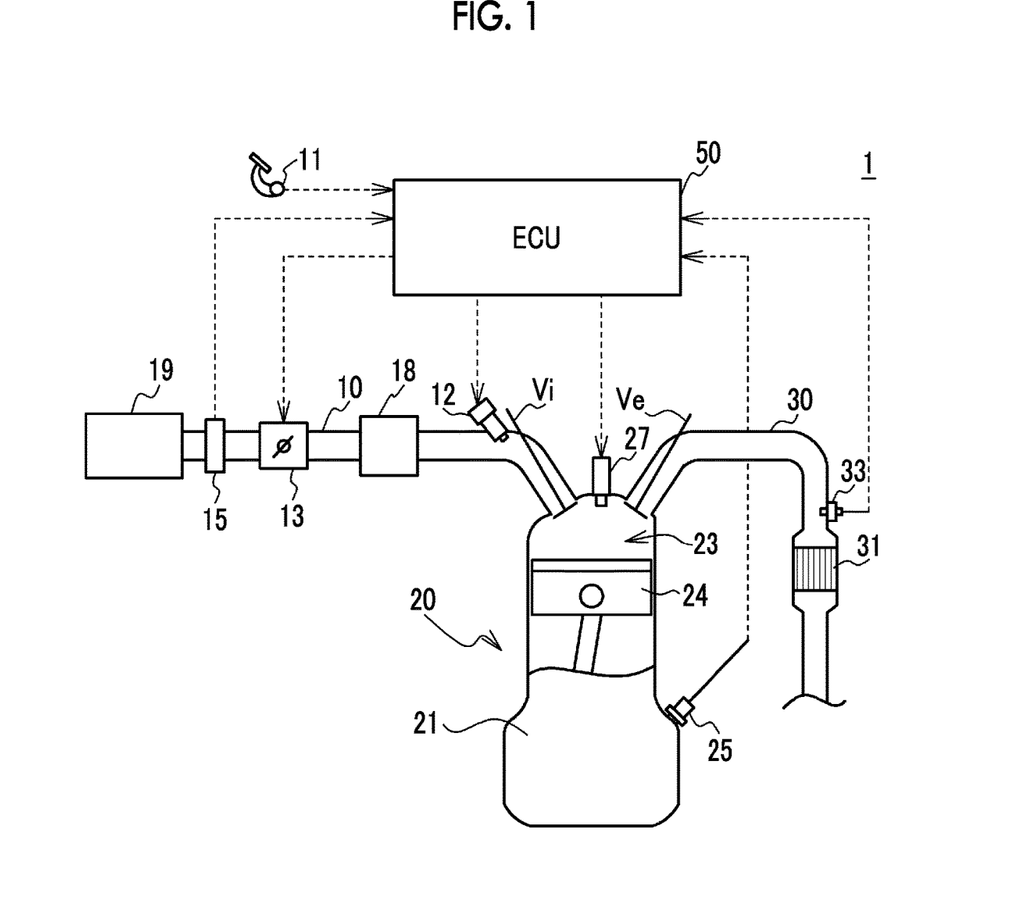
FIG. 1 is a schematic configuration view of an engine system to which a control apparatus for an internal combustion engine according to the embodiment of the disclosure is applied.

FIG. 1 is a schematic configuration view of an engine system 1. As shown in FIG. 1, the engine system 1 is equipped with an electronic control unit (an ECU) 50 that controls an engine 20. The ECU 50 is an exemplary control apparatus for an internal combustion engine. The engine 20 is an exemplary internal combustion engine in which an air-fuel mixture is burned in a combustion chamber 23 in a cylinder block 21 to move a piston 24 in a reciprocating manner. The engine 20 is an in-line four-cylinder gasoline engine, but is not limited thereto as long as it has a plurality of cylinders. For example, the engine 20 may be a diesel engine.

In a cylinder head of the engine 20, an intake valve Vi that opens/closes an intake port and an exhaust valve Ve that opens/closes an exhaust port are provided for each of the cylinders. Besides, an ignition plug 27 for igniting the air-fuel mixture in the combustion chamber 23 is attached to a top portion of the cylinder head, for each of the cylinders.

The intake port of each of the cylinders is connected to a surge tank 18 via a branch pipe for each of the cylinders. An intake pipe 10 is connected to an upstream side of the surge tank 18, and an air cleaner 19 is provided at an upstream end of the intake pipe 10. Moreover, the intake pipe 10 is provided, sequentially from the upstream side, with an airflow meter 15 for detecting an intake air amount and an electronically controlled throttle valve 13.

Besides, an injector 12 that injects fuel into the intake port is installed in the intake port of each of the cylinders. The fuel injected from the injector 12 is mixed with intake air to form the air-fuel mixture. When the intake valve Vi opens, this air-fuel mixture is sucked into the combustion chamber 23, compressed by the piston 24, and ignited by the ignition plug 27 to be burned.

The exhaust port of each of the cylinders is connected to an exhaust pipe 30 via a branch pipe for each of the cylinders. The exhaust pipe 30 is provided with a three-way catalyst 31. An air-fuel ratio sensor 33 for detecting an air-fuel ratio of exhaust gas is installed upstream of the three-way catalyst 31. The air-fuel ratio sensor 33 is a so-called wide-range air-fuel ratio sensor. The air-fuel ratio sensor 33 can continuously detect an air-fuel ratio over a relatively wide range, and outputs a signal of a value proportional to the air-fuel ratio.

The ECU 50 is equipped with a central processing unit (a CPU), a random access memory (a RAM), a read only memory (a ROM), a storage device and the like. The ECU 50 performs various kinds of control by executing programs stored in the ROM and the storage device. Besides, the ECU 50 functionally realizes a first-order filter unit, a fourth-order filter unit, a disturbance determination unit, a combustion state determination unit, a first-order parameter calculation unit and a fourth-order parameter calculation unit by the CPU, the ROM, the RAM and the like. The details will be described later.

The above-mentioned ignition plug 27, the above-mentioned throttle valve 13, the above-mentioned injector 12 and the like are electrically connected to the ECU 50. Besides, an accelerator opening degree sensor 11 that detects an accelerator opening degree and various other sensors as well as the foregoing airflow meter 15, the foregoing air-fuel ratio sensor 33 and a crank angle sensor 25 that detects a crank angle of the engine 20 are electrically connected to the ECU 50 via A/D converters (not shown) and the like. The ECU 50 controls the ignition plug 27, the throttle valve 13, the injector 12 and the like such that desired outputs are obtained, based on detection values of the various sensors and the like, and controls an ignition timing, a fuel injection amount, a fuel injection timing, a throttle opening degree and the like. The crank angle sensor 25 detects a crank angle, and outputs a rotational speed signal indicating a rotational speed of the engine 20 to the ECU 50.

Figure 2:
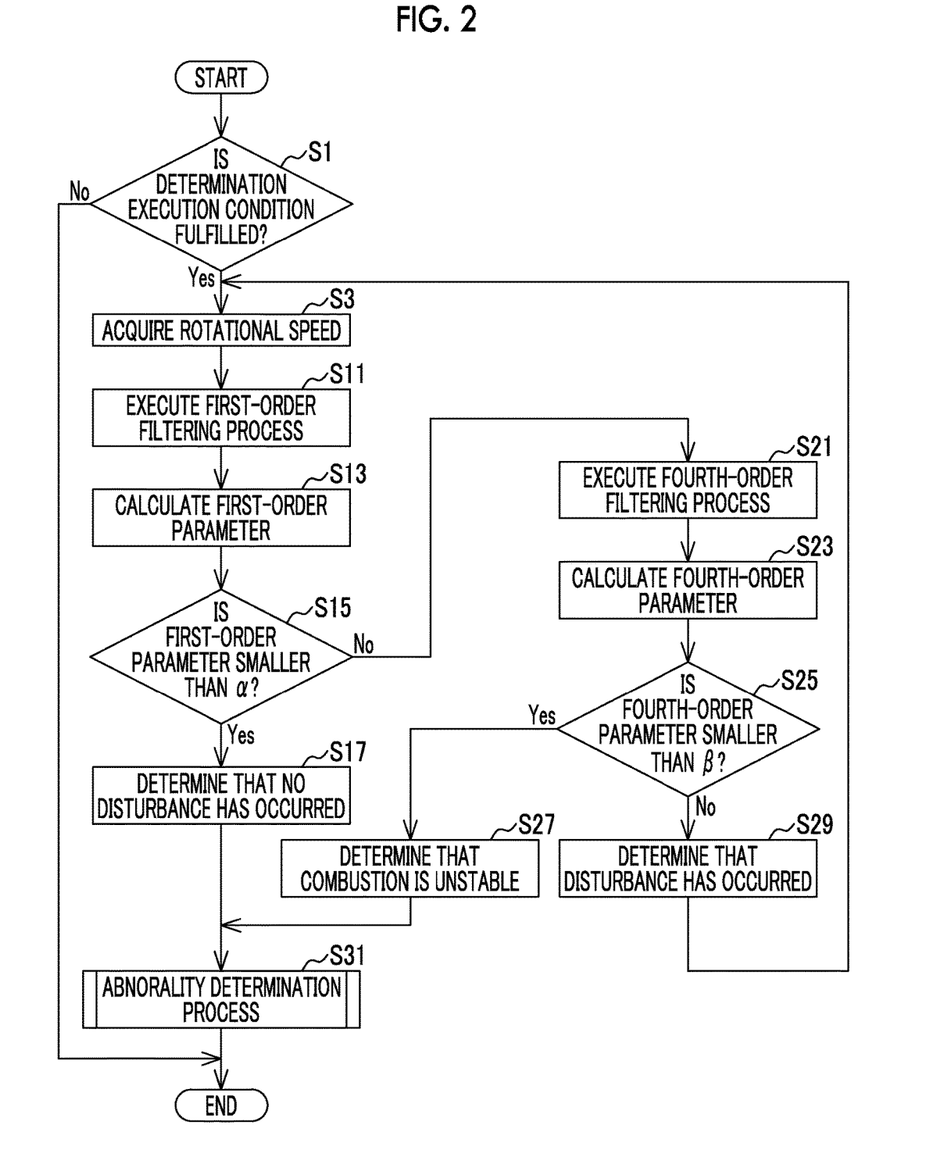
FIG. 2 is a flowchart showing an example of control that is performed by an electronic control unit (an ECU) with which the control apparatus according to the embodiment of the disclosure is equipped.

Next, the control that is performed by the ECU 50 will be described. The ECU 50 executes an abnormality determination process (step S31) upon fulfillment of a predetermined determination condition. The abnormality determination process is a process of determining whether or not the engine 20 is in an abnormal state such as an abnormality in the air-fuel ratio, a misfire or the like, based on, for example, a fluctuation rate of the rotational speed of the engine 20 or the like. If a disturbance results from running on a rough road or the combustion in the engine 20 is unstable as will be described later in detail in executing the abnormality determination process in this manner, the accuracy in making a determination in the abnormality determination process may be influenced. Therefore, the ECU 50 determines whether or not a disturbance has occurred, and also determines whether or not the combustion is unstable, before executing the abnormality determination process.

It is determined whether or not a disturbance has occurred and whether or not the combustion is unstable, based on order components of a rotational speed signal in the case where one cycle is defined as one combustion cycle of the engine 20. This is because a disturbance resulting from running on a rough road and the unstableness of combustion are reflected by a predetermined order component of the rotational speed signal of the engine 20. Incidentally, the rotational speed signal may be a signal correlated with the rotational speed of the engine 20, for example, an output signal of a cam angle sensor that detects a rotational angle of a camshaft that is interlocked with a crankshaft.

Figure 3A:
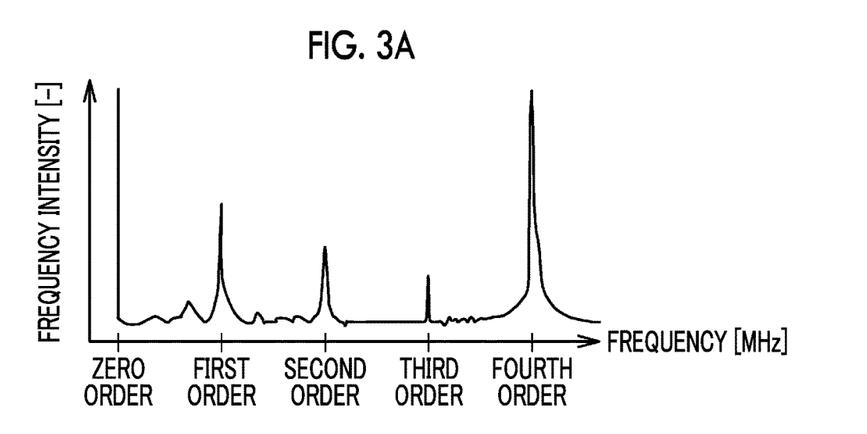
FIG. 3A is an exemplary graph indicating a frequency analysis result of a rotational speed signal in a case where no disturbance has occurred and combustion is stable in the internal combustion engine.
Figure 3B:
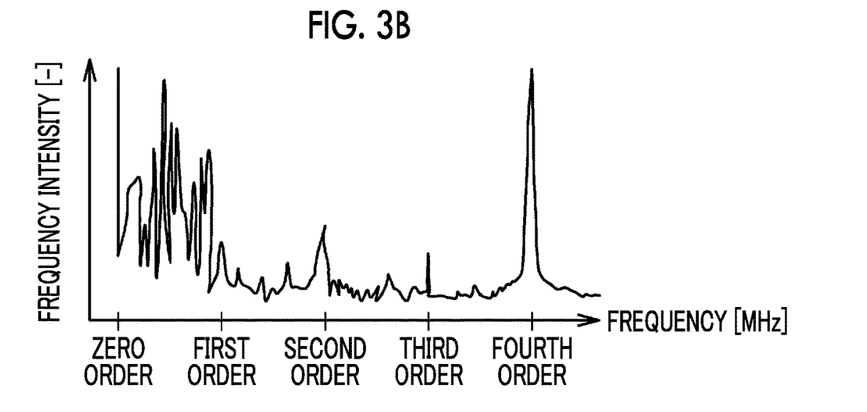
FIG. 3B is an exemplary graph indicating a frequency analysis result of a rotational speed signal in a case where a disturbance has occurred but the combustion is stable in the internal combustion engine.
Figure 3C:
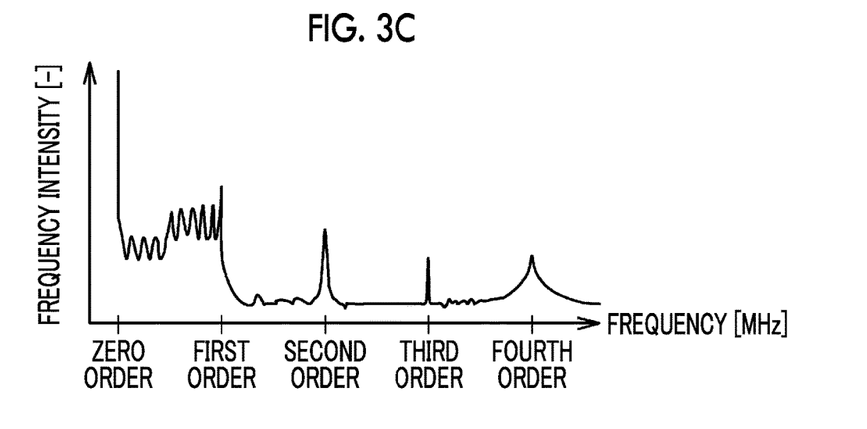
FIG. 3C is an exemplary graph indicating a frequency analysis result of a rotational speed signal in a case where no disturbance has occurred but the combustion is unstable in the internal combustion engine.

Next, the influence of a disturbance resulting from running on a rough road or the unstableness of combustion on the order components of the rotational speed signal of the crank angle sensor 25 will be described. FIGS. 3A to 3C are exemplary graphs showing frequency analysis results of the rotational speed signal in the case where no disturbance has occurred and the combustion is also stable, in the case where a disturbance has occurred but the combustion is stable, and in the case where no disturbance has occurred but the combustion is unstable, respectively.

In the case where a disturbance has occurred as shown in FIG. 3B, the intensity of the first- and lower-order (i.e. the first-order and the lower-order than the first-order) components is higher than in the case of FIG. 3A where no disturbance has occurred. This is because a disturbance resulting from running on a rough road imparts low-frequency vibrations to the rotational speed of the engine 20 that rotates at a relatively high speed.

Besides, in the case where the combustion is unstable as shown in FIG. 3C, the intensity of the fourth-order component is lower than in the case of FIG. 3A. It should be noted herein that the engine 20 has four cylinders, and that ignition is carried out four times in total to realize a combustion stroke during one combustion cycle. Therefore, every time fuel is ignited in each of the cylinders, the rotational speed rises temporarily. Accordingly, fluctuations in rotational speed resulting from four times of ignition during one combustion cycle are reflected by the fourth-order component of the rotational speed signal.

It should be noted herein that in the case where the combustion in one of the four cylinders is unstable, even when fuel is ignited in the cylinder in which the combustion is unstable, the rotational speed does not rise as substantially as when fuel is ignited in the cylinders in which the combustion is stable. Therefore, when the combustion is unstable in one of the cylinders, the intensity of the fourth-order component is lower than when the combustion is stable in all the cylinders. In particular, when a misfire occurs at an arbitrary timing in one of the cylinders, the intensity of the fourth-order component falls substantially.

Incidentally, as shown in FIG. 3C, in the case where the combustion is unstable, even when no disturbance has occurred, the intensity of the first- and lower-order components is higher than in the case of FIG. 3A. This is because a vehicle body vibrates at low frequency through a temporary decrease in the driving force of the engine 20 as a result of the unstableness of combustion, and the vibrations of this vehicle body influence the first- and lower-order components.

Next, the control that is performed by the ECU 50 will be described. FIG. 2 is a flowchart showing an example of the control that is performed by the ECU 50. The ECU 50 repeatedly performs this control on a predetermined cycle.

The ECU 50 determines whether or not a determination execution condition for determining whether or not the engine 20 is in a state suited to execute the above-mentioned abnormality determination process is fulfilled (step S1). For example, when the engine 20 is in a normal operating state that is neither a cold state nor a transient operating state, it is determined that the determination execution condition is fulfilled. In concrete terms, this normal operating state includes (i) that the temperature of coolant for the engine 20 is equal to or higher than a predetermined value and the engine 20 is not in the cold state, (ii) that the air-fuel ratio is within a predetermined range, (iii) the amount of intake air is within a predetermined range, (iv) the opening degree of the throttle valve 13 has not transiently changed, (v) a shift lever has not been operated, (vi) the rotational speed of the engine 20 does not fall within a resonant speed range, and the like. If all these conditions are satisfied, it is determined that the determination execution condition is fulfilled. If the determination execution condition is not fulfilled, the present control is ended.

If the determination execution condition is fulfilled, the ECU 50 acquires a rotational speed signal from the crank angle sensor 25 (step S3). The process of step S1 is an exemplary process that is executed by an acquisition unit that acquires a rotational speed signal correlated with the rotational speed of the engine 20.

Subsequently, the ECU 50 subjects an output signal acquired in step S3 to a first-order filtering process (step S11). The first-order filtering process is a process of extracting first- and lower-order components of the rotational speed signal. The first-order filtering process is executed through the use of a digital filter having filtering properties of extracting at least the first- and lower-order components of the rotational speed signal, for example, a low-pass filter or a band-pass filter. The process of step S11 is an exemplary process that is executed by the first-order filter unit that extracts, from the acquired rotational speed signal, at least the first- and lower-order components of the rotational speed signal in the case where one cycle is defined as one combustion cycle of the engine 20.

Subsequently, the ECU 50 calculates a first-order parameter indicating the magnitude of an amplitude of the first- and lower-order components, based on the first- and lower-order components extracted in step S11 (step S13). In concrete terms, the length of a waveform of the extracted first- and lower-order components within a predetermined period is calculated as the first-order parameter. This is because the long length of these first- and lower-order components indicates that the amplitude of the first- and lower-order components is large and hence that the intensity of the disturbance is high. The length of the waveform within the predetermined period is calculated through integration. The process of step S13 is an exemplary process that is executed by the first-order parameter calculation unit that calculates, as the first-order parameter, the length of the waveform of the extracted first- and lower-order components shown on a time axis within the predetermined period.

Figure 4A:
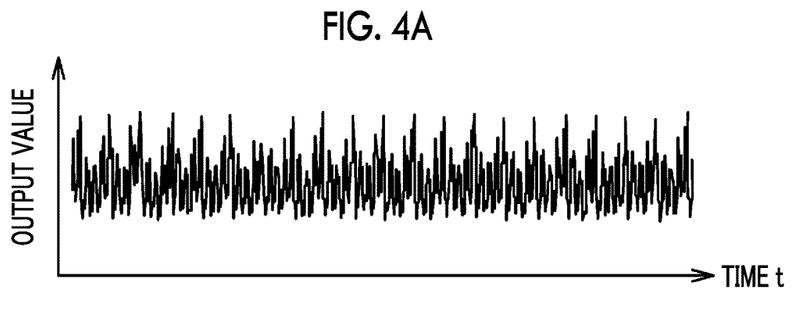
FIG. 4A is an exemplary graph indicating a waveform of the rotational speed signal in the case where no disturbance has occurred and the combustion is stable in the internal combustion engine.
Figure 4B:
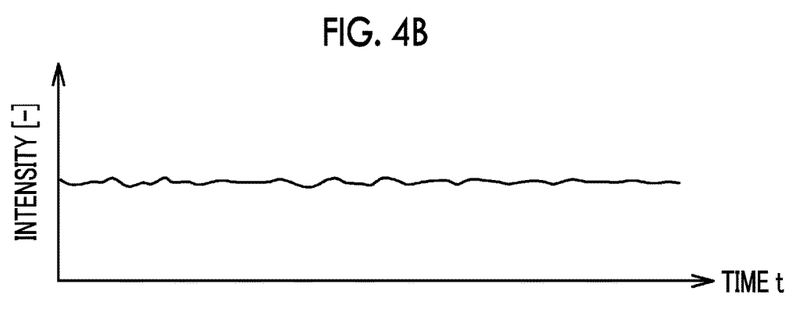
FIG. 4B is an exemplary graph indicating a waveform of extracted first-order and lower-order than first-order components of the rotational speed signal in the case where no disturbance has occurred and the combustion is stable in the internal combustion engine.
Figure 4C:
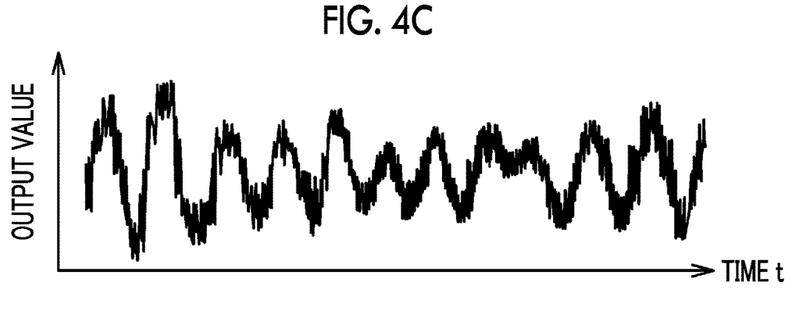
FIG. 4C is an exemplary graph indicating the waveform of the rotational speed signal in the case where the disturbance has occurred but the combustion is stable in the internal combustion engine.
Figure 4D:
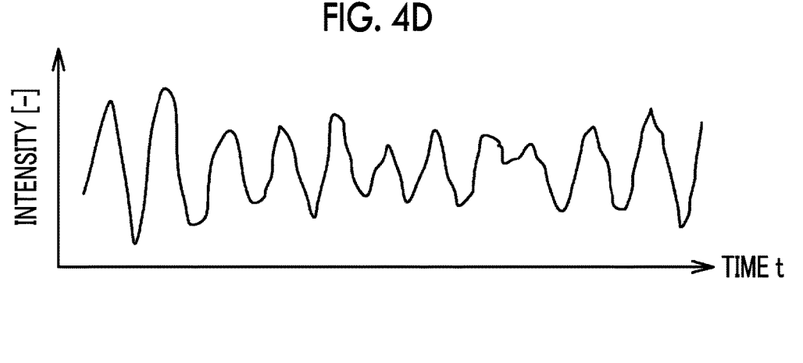
FIG. 4D is an exemplary graph indicating the waveform of extracted first-order and lower-order than the first-order components of the rotational speed signal in the case where the disturbance has occurred but the combustion is stable in the internal combustion engine.

FIGS. 4A and 4B are exemplary graphs indicating the waveform of the rotational speed signal and the waveform of the extracted first- and lower-order components respectively in the case where no disturbance has occurred and the combustion is also stable. FIGS. 4C and 4D are exemplary graphs indicating the waveform of the rotational speed signal and the waveform of the extracted first- and lower-order components respectively in the case where a disturbance has occurred but the combustion is stable. In each of FIGS. 4A and 4C, the axis of ordinate represents the output value of the rotational speed signal, namely, the magnitude of the rotational speed of the engine 20. In each of FIGS. 4B and 4D, the axis of ordinate represents the intensity of the extracted first- and lower-order components. In each of FIGS. 4A to 4D, the axis of abscissa represents the time.

In the case where no disturbance has occurred, the rotational speed signal periodically fluctuates as shown in FIG. 4A, but the waveform of the first- and lower-order components is substantially rectilinear as shown in FIG. 4B. In contrast, when a disturbance occurs, the rotational speed signal fluctuates on a relatively long cycle as shown in FIG. 4C, and the amplitude of the waveform of the extracted first- and lower-order components increases as shown in FIG. 4D. As described hitherto, the waveform of the first- and lower-order components is longer in the case where a disturbance has occurred than in the case where no disturbance has occurred. In consequence, the length of the waveform of the first- and lower-order components within the predetermined period is calculated as the first-order parameter, and it can be determined, based on the magnitude of this first-order parameter, whether or not a disturbance has occurred. Incidentally, "the predetermined period" in calculating the first-order parameter is set to a length that is equal to or longer than one cycle as one combustion cycle.

Subsequently, the ECU 50 determines whether or not the first-order parameter is smaller than a threshold α (step S15). The threshold α is calculated in advance through an experiment, and is stored in the ROM of the ECU 50. The threshold α is an exemplary first threshold. If the first-order parameter is smaller than the threshold α, the ECU 50 determines that no disturbance has occurred (step S17), and thereafter executes the abnormality determination process (step S31) based on the rotational speed signal acquired in step S3.

Figure 5:
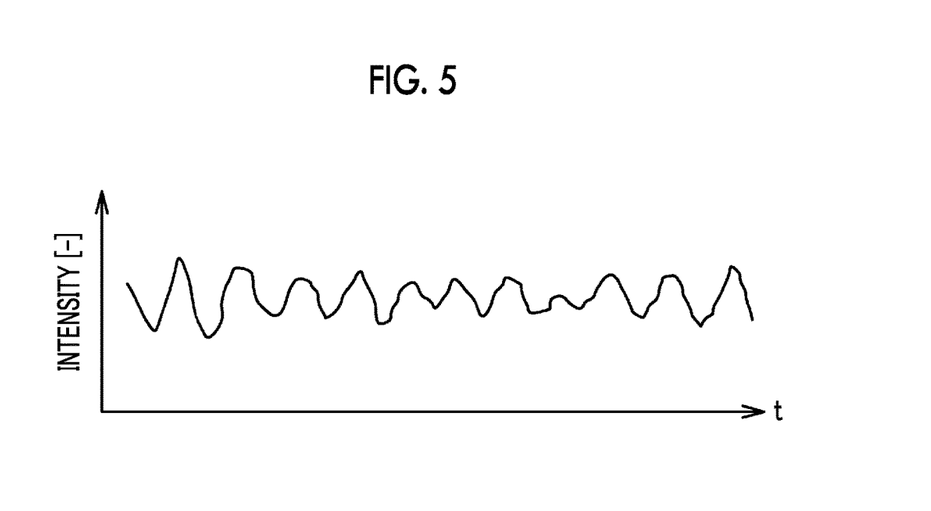
FIG. 5 is a graph showing the waveform of the extracted first-order and lower-order than the first-order components of the rotational speed signal in the internal combustion engine.

As described above, if the first-order parameter is smaller than the threshold α, it is determined that no disturbance has occurred. Therefore, if the first-order parameter is equal to or larger than the threshold α, it is conceivable to determine that a disturbance has occurred. However, as shown in FIG. 3C, even in the case where no disturbance has occurred, when the combustion is unstable, the intensity of the first- and lower-order components of the rotational speed signal rises. FIG. 5 is a graph showing the waveform of the extracted first- and lower-order components in the case where no disturbance has occurred but the combustion is unstable. The amplitude of the waveform of FIG. 5 is not as large as that of FIG. 4D, but is larger than that of FIG. 4B. Therefore, if it is determined, based only on the first-order parameter, whether or not a disturbance has occurred, it may be determined, as a result of the unstableness of combustion, that a disturbance has occurred although no disturbance has actually occurred.

Thus, the ECU 50 further subjects the output signal acquired in step S3 to a fourth-order filtering process (step S21). The fourth-order filtering process is a process of extracting a fourth-order component of the acquired rotational speed signal in the case where one cycle is defined as one combustion cycle of the engine 20. The fourth-order filtering process is executed through the use of, for example, a digital filter having filtering properties of extracting at least the fourth-order component of the rotational speed signal, for example, a band-pass filter. The process of step S21 is an exemplary process that is executed by the fourth-order filter unit that extracts, from the acquired rotational speed signal, at least the fourth-order component of the rotational speed signal in the case where one cycle is defined as one combustion cycle of the engine 20.

Figure 6A:
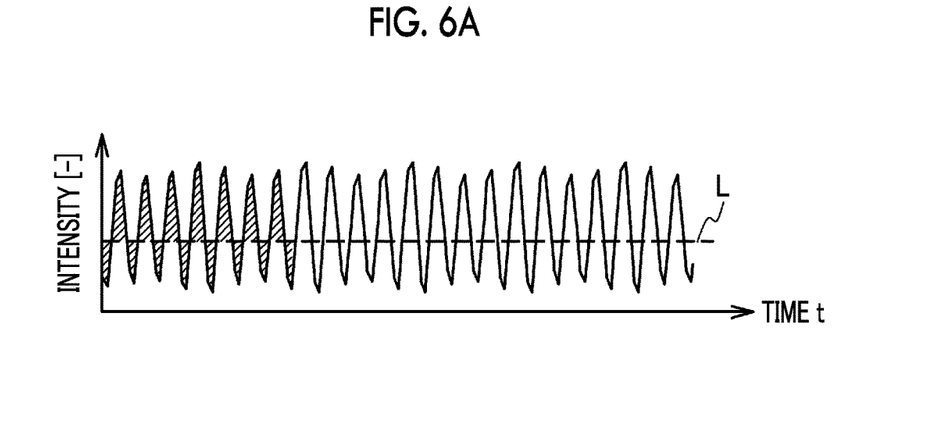
FIG. 6A is an exemplary graph showing a waveform of an extracted fourth-order component of the rotational speed signal in the case where the disturbance has occurred but the combustion is stable in the internal combustion engine.
Figure 6B:
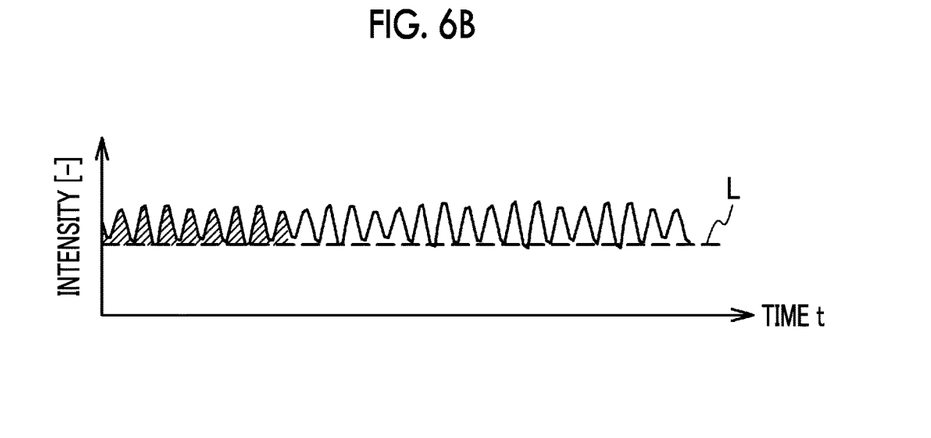
FIG. 6B is an exemplary graph showing the waveform of the extracted fourth-order component of the rotational speed signal in the case where no disturbance has occurred but the combustion is unstable in the internal combustion engine.

FIG. 6A is an exemplary graph showing the waveform of the extracted fourth-order component in the case where a disturbance has occurred but the combustion is stable. FIG. 6B is an exemplary graph showing the waveform of the extracted fourth-order component in the case where no disturbance has occurred but the combustion is unstable. In each of FIGS. 6A and 6B, the axis of ordinate represents the intensity of the extracted fourth-order component, and the axis of abscissa represents the time. As described above, when the combustion is stable, the amplitude of the extracted fourth-order component is large as shown in FIG. 6A, whereas when the combustion is unstable, the amplitude of the fourth-order component is small as shown in FIG. 6B.

Subsequently, the ECU 50 calculates a fourth-order parameter (step S23). In concrete terms, an area that is surrounded by the waveform of the extracted fourth-order component and a straight line intersecting with this waveform and extending parallel to the time axis within a predetermined period is calculated as the fourth-order parameter. This area is calculated through integration. This is because the smallness of this area indicates that the amplitude of the fourth-order component is small, and the smallness of the amplitude of the fourth-order component indicates that the combustion state of at least one of the four cylinders is unstable. In consequence, this area is calculated as the fourth-order parameter, and it can be determined, based on the magnitude of this fourth-order parameter, that the combustion is unstable. Incidentally, "the predetermined period" in calculating the fourth-order parameter is set to a length that is equal to or longer than one cycle as one combustion cycle. As this period lengthens, the accuracy in determining that the combustion is unstable as will be described later is enhanced. The process of step S23 is an exemplary process that is executed by the fourth-order parameter calculation unit that calculates, as the fourth-order parameter, the area that is surrounded by the waveform of the fourth-order component shown on the time axis and the straight line extending parallel to the time axis within the predetermined period. The fourth-order parameter calculation unit is an exemplary n-th-order parameter calculation unit.

Besides, each of FIGS. 6A and 6B shows a straight line L intersecting with this waveform and extending parallel to the time axis. The area that is surrounded by the extracted fourth-order component and the straight line L within the predetermined period is the area of a hatched region in each of FIGS. 6A and 6B. It is apparent that the area of FIG. 6A is smaller than the area of FIG. 6B.

Subsequently, the ECU 50 determines whether or not the fourth-order parameter is smaller than a threshold β (step S25). The threshold β is calculated in advance through an experiment, and is stored in the ROM of the ECU 50. The threshold β is an exemplary second threshold. If the fourth-order parameter is smaller than the threshold β, the ECU 50 determines that the combustion is unstable but no disturbance has occurred (step S27), and executes the abnormality determination process (step S31) based on the rotational speed signal acquired in step S3. Step S27 is an exemplary process that is executed by a combustion determination unit that determines that the combustion state of the engine 20 is unstable when the first-order parameter is equal to or larger than the threshold α and the n-th-order parameter is smaller than the threshold β. Thus, it can be determined whether or not the combustion is unstable as a result of rich imbalance.

If the fourth-order parameter is equal to or larger than the threshold β, it is determined that a disturbance has occurred (step S29). Then, the processes starting from step S3 are executed again. Incidentally, the processes that are executed after step S29 or step S27 are not limited to the aforementioned processes. For example, the processes starting from step S1 may be executed again, or the present control may be ended after the process of step S29. Besides, the process of step S31 may not be executed after the process of step S27.

As described hitherto, if the first-order parameter is equal to or larger than the threshold α and the fourth-order parameter is smaller than the threshold β, it is determined that the combustion is unstable. If the fourth-order parameter is equal to or larger than the threshold β, the combustion is regarded as stable, and it is determined that a disturbance has occurred. Therefore, it can be restrained from being determined, as a result of the unstableness of combustion, that a disturbance has occurred, and the accuracy in making a determination on the occurrence of a disturbance can be restrained from deteriorating. Accordingly, the processes of steps S15, S17, S25 and S29 are exemplary processes that are executed by the disturbance determination unit that determines that no disturbance has occurred if the first-order parameter is smaller than the threshold α, and that determines that a disturbance has occurred if the first-order parameter is equal to or larger than the threshold α and the n-th-order parameter is equal to or larger than the threshold β.

Besides, as shown in FIGS. 6A and 6B, the area defined by the waveform of the fourth-order component over the predetermined period is calculated as the fourth-order parameter. Therefore, this area is likely to be reflected by the value of the fourth-order parameter, for example, when the combustion in one of the cylinders becomes unstable at an arbitrary timing or when a misfire intermittently occurs as well as when the combustion in a predetermined one of the cylinders is always unstable. Therefore, even in such a case, it can be accurately determined that the combustion is unstable. Incidentally, this unstableness of combustion may result from rich imbalance. Imbalance means that the air-fuel ratio is dispersed among the cylinders, and rich imbalance means that the air-fuel ratio of one of the plurality of the cylinders is smaller than the air-fuel ratio of the other cylinders.

In step S17, it may be determined that no disturbance has occurred, and that the combustion is also stable. This is because of the following reason. As described above, when the combustion is unstable, the first-order parameter is equal to or larger than the threshold α. However, if it is determined that the first-order parameter is smaller than the threshold α, the combustion can also be regarded as stable.

Besides, in step S29, it may be determined that a disturbance has occurred, and that the combustion is stable. This is because the combustion can be regarded as stable when the fourth-order parameter is equal to or larger than the threshold β, as described above.

In step S31, another process, for example, dither control, vibration damping control or the like may be executed instead of the abnormality determination process. In this case, it is determined in step S1 whether or not a condition for performing dither control or vibration damping control is fulfilled. It can be selected whether or not the control can be performed, by determining whether or not there is a disturbance or whether or not the combustion is unstable, before performing this control. Incidentally, dither control is designed to set the air-fuel ratio of an arbitrary one of the plurality of the cylinders rich, and set the air-fuel ratio of the other cylinders lean. Vibration damping control is designed to control the output of the engine 20 in such a manner as to suppress vertical vibrations of unsprung components of suspensions based on fluctuations in the rotational speeds of wheels.

In the aforementioned embodiment of the disclosure, the fourth-order parameter is calculated after calculating the first-order parameter. The disclosure is not limited to this sequence, but it is desirable to calculate the parameters in this sequence. This is because of the following reason. For example, the difference in the intensity of the fourth-order component is considered to be slight between the case where the combustion is intermittently unstable only in an arbitrary one of the cylinders and the case where the combustion is always stable in all the cylinders. Therefore, with a view to enhancing the accuracy in making a determination on the combustion state, the area defined by the waveform of the fourth-order component in a relatively long period is desired to be calculated as the fourth-order parameter. Accordingly, the time for calculating the fourth-order parameter may become longer than the time for calculating the first-order parameter. Therefore, in the case where no disturbance has occurred and the combustion is also stable, the abnormality determination process (step S31) can be executed earlier if the process regarding the first-order parameter is executed first.

In the aforementioned embodiment of the disclosure, the length of the waveform of the extracted first- and lower-order components in the predetermined period is calculated as the first-order parameter, but the disclosure is not limited thereto. As is the case with the above-mentioned method of calculating the fourth-order parameter, an area that is surrounded by the waveform of the extracted first- and lower-order components and a straight line extending parallel to the time axis may be calculated as the first-order parameter. Besides, in the aforementioned embodiment of the disclosure, the area that is surrounded by the waveform of the extracted fourth-order component and the straight line extending parallel to the time axis is calculated as the fourth-order parameter, but the disclosure is not limited thereto. A length of the waveform of the extracted fourth-order component in a predetermined period may be calculated as the fourth-order parameter.

In the aforementioned embodiment of the disclosure, the example of the engine 20 having the four cylinders has been described, but the disclosure is not limited thereto. For example, in the case where the engine has n (n>2) cylinders, it is determined that the combustion is unstable, based on an n-th-order parameter regarding the magnitude of an amplitude of an n-th-order component extracted from an acquired rotational speed signal. This is because ignition is carried out n times in one combustion cycle in the case where there are n cylinders. For example, the aforementioned determination is made based on a second-order parameter regarding the magnitude of an amplitude of an extracted second-order component in the case of a two-cylinder engine, and based on an eighth-order parameter regarding the magnitude of an amplitude of an extracted eighth-order component in the case of an eight-cylinder engine.

Although the embodiment of the disclosure has been described above in detail, the disclosure is not limited to this specific embodiment thereof, but can be modified or altered in various manners within the scope of the gist of the disclosure set forth in the claims.

What is claimed is:

1. A control apparatus for an internal combustion engine, the control apparatus comprising:
an electronic control unit configured to:
  (i) acquire a rotational speed signal correlated with a detected rotational speed of the internal combustion engine having n cylinders, where n is larger than two,
  (ii) extract, from the acquired rotational speed signal, at least first-order and lower-order than the first-order components of the rotational speed signal, where one cycle is defined as one combustion cycle of the internal combustion engine,
  (iii) extract, from the acquired rotational speed signal, at least an n-th-order component of the rotational speed signal, where one cycle is defined as one combustion cycle of the internal combustion engine,
  (iv) determine that no disturbance has occurred in the rotational speed of the internal combustion engine when a first-order parameter regarding a magnitude of an amplitude of the extracted first-order and lower-order than the first-order components is smaller than a first threshold,
  (v) determine that a disturbance has occurred in the rotational speed of the internal combustion engine when the first-order parameter is equal to or larger than the first threshold and an n-th-order parameter regarding an amplitude of the extracted n-th-order component is equal to or larger than a second threshold, and
  (vi) in response to determining that no disturbance has occurred in the rotational speed of the internal combustion engine, control an operation state of the internal combustion engine based on at least outputs from a plurality of sensors, and in response to determining that the disturbance has occurred in the rotational speed of the internal combustion engine, do not control the operation state of the internal combustion engine.

2. The control apparatus for the internal combustion engine according to claim 1, wherein the electronic control unit is configured to determine that a combustion state of the internal combustion engine is unstable when the n-th-order parameter is smaller than the second threshold.

3. The control apparatus for the internal combustion engine according to claim 1, wherein the electronic control unit is configured to calculate a length as the first-order parameter, the length being a length of a waveform of the extracted first-order and lower-order than the first-order components shown on a time axis within a predetermined period.

4. The control apparatus for the internal combustion engine according to claim 1, wherein the electronic control unit is configured to calculate a length as the n-th-order parameter, the length being a length of a waveform of the extracted n-th-order component shown on a time axis within a predetermined period.

5. The control apparatus for the internal combustion engine according to claim 1, wherein the electronic control unit is configured to calculate an area as the first-order parameter, the area being surrounded by a waveform of the first-order and lower-order than the first-order components shown on a time axis and a straight line extending parallel to the time axis within a predetermined period.

6. The control apparatus for the internal combustion engine according to claim 1, wherein the electronic control unit is configured to calculate an area as the n-th-order parameter, the area being surrounded by a waveform of the n-th-order component shown on a time axis and a straight line extending parallel to the time axis within a predetermined period.

* * * * *